United States Patent
Freier et al.

(10) Patent No.: US 6,282,821 B1
(45) Date of Patent: Sep. 4, 2001

(54) LOW-LOSS FACE DIFFUSER FILMS FOR BACKLIT SIGNAGE AND METHODS FOR USING SAME

(75) Inventors: David G. Freier, St Paul; Neal T. Strand, Woodbury; Scott R. Kaytor, Minneapolis; Frank L. Deyak, Stillwater, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/104,874

(22) Filed: Jun. 25, 1998

(51) Int. Cl.$^7$ .............................. G09F 13/00; G02B 5/02
(52) U.S. Cl. ..................... 40/564; 40/541; 362/812; 359/599; 428/343; 428/458; 428/460; 428/461; 428/472
(58) Field of Search ...................... 428/430, 441, 428/451, 483, 689, 702, 332; 362/31, 812; 359/599; 264/1.31, 1.7; 40/541, 546, 549, 564, 573, 427

(56) References Cited

U.S. PATENT DOCUMENTS

| | | | |
|---|---|---|---|
| 3,631,474 | * 12/1971 | Majewski | 340/366 R |
| 3,968,584 | * 7/1976 | Kingston | 40/130 K |
| 4,415,509 | * 11/1983 | Toyooka et al. | 264/1.3 |
| 4,436,377 | 3/1984 | Miller | 350/345 |
| 4,539,256 | 9/1985 | Shipman | 428/315.5 |
| 4,726,989 | 2/1988 | Mrozinski | 428/315.5 |
| 4,729,068 | * 3/1988 | Ohe | 362/31 |
| 4,826,294 | 5/1989 | Imoto | 350/345 |
| 4,989,933 | 2/1991 | Duguay | 350/96.1 |
| 5,120,594 | 6/1992 | Mrozinski | 428/195 |
| 5,141,790 | 8/1992 | Calhoun et al. | 428/40 |
| 5,229,207 | 7/1993 | Paquette et al. | 428/355 |
| 5,296,277 | 3/1994 | Wilson et al. | 428/40 |
| 5,362,516 | 11/1994 | Wilson et al. | 427/207.1 |
| 5,384,658 | 1/1995 | Ohtake et al. | 359/707 |
| 5,414,947 | * 5/1995 | Hjaltason | 40/615 |
| 5,680,720 | * 10/1997 | Asazuma et al. | 40/564 |
| 5,725,957 | * 3/1998 | Varaprasad et al. | 428/428 |
| 5,746,857 | 5/1998 | Murata et al. | 156/102 |
| 5,800,919 | 9/1998 | Peacock et al. | 428/355 AC |
| 5,825,542 | * 10/1998 | Cobb, Jr. et al. | 359/487 |
| 5,918,396 | * 7/1999 | Jung | 40/546 |

FOREIGN PATENT DOCUMENTS

| | | |
|---|---|---|
| WO 97/01774 | 1/1997 | (WO) . |
| WO 97/01781 | 1/1997 | (WO) . |
| WO 97/32224 | 4/1997 | (WO) . |
| WO 97/18246 | 5/1997 | (WO) . |
| WO 97/31076 | 8/1997 | (WO) . |
| WO 98/29516 | 7/1998 | (WO) . |

* cited by examiner

Primary Examiner—Deborah Jones
Assistant Examiner—Stephen Stein
(74) Attorney, Agent, or Firm—Dale A. Bjorkman (57) ABSTRACT

A low-loss, diffuser film is provided for translucent surface(s) of lighted signage. The film has little absorptivity and has partial transmissivity and partial reflectivity. Luminance efficiency and brightness are significantly improved over conventional films used in backlit signage. A luminance efficiency prediction equation is also provided to aid in selection of diffuser films and interior surfaces of the lighted sign cavity. A combination of effects of diffuser films and a diffuse reflective films lining the interior surfaces of the lighted sign cavity is unexpectedly greater than their sum of effects operating alone.

11 Claims, 5 Drawing Sheets

Fig. 6

LOW-LOSS FACE DIFFUSER FILMS FOR BACKLIT SIGNAGE AND METHODS FOR USING SAME

FIELD OF INVENTION

This invention relates to diffuser films for use in the signage industry to increase lighting efficiency.

BACKGROUND OF INVENTION

Lighted signs are everywhere in modern countries. The sign can educate, entertain, inform, or warn the viewer. The sign can be designed for close or distant viewing. Lighting is provided to assure the viewer can see the message, particularly during dimly lit days or nighttime.

Lights require energy to power them. Modern countries readily can provide the power, but those who pay for the energy are always seeking more efficient delivery of the power and more efficient usage of the power. The energy required to power a lighted sign should not be wasted for economic and environmental reasons.

Lighted signs can be "front lit" or "back lit". The former typically include such signs as billboards or other displays where the light is shone from the perimeter of the sign at an angle toward the sign. The latter typically have a translucent surface through which the light is seen and on which the message or image is placed. Uniformity of light emanating from the translucent surface is important. Often, the translucent surface includes some element that diffuses the light to reduce the identification by the viewer of the point or linear source of the light within the sign housing. Moreover, typical backlit signage today allows less than 30% of the light to escape from inside the sign for viewing. Clearly, a more efficient lighting system is needed.

The lighted sign can be in any configuration: Light sources can be neon, fluorescent, incandescent, halogen, high intensity discharge (HID), light emitting diodes (LED), or light fibers. The sign can be integral to a building, mounted as a fixture on a building, freestanding, or a part of other apparatus or equipment. The light can be powered continuously, periodically, episodically, or irregularly. Whenever the sign is lighted, the power used should not be wasted.

The lighted sign cavity can be any geometric configuration.

Lighted signs that have a perimeter shape of a complex geometry to convey the intended message are entirely different types of signs from lighted signs that rely on a Euclidean geometry with the intended message within the perimeter. In the industry, an example of the former type of sign is called "channel letters" and can generically be called "complex shape lighted signs." The latter are called "sign cabinets" because the perimeter of the sign is irrelevant to the message being conveyed.

Nonlimiting examples of sign cabinets include rectangular, oval, circular, elliptical, and other Euclidean geometrical shapes. Nonlimiting examples of complex shape lighted signs include letters, profiles, silhouettes, characters, or any other shape desired by a customer that helps to advertise, educate, warn or the like.

Lighting of Euclidean geometric sign cabinets is more predictable than complex shape lighted signs, because even distribution of the light is quite difficult to obtain unless the light source has substantially the same shape as the viewing area of the sign.

SUMMARY OF INVENTION

What the art of lighted signage needs is a diffuser layer for use in association with the translucent surface of a lighted sign, that can improve the luminance efficiency of the lighted sign and therefore increase the brightness, reduce the power consumption or achieve a combinations of these benefits.

"Luminance efficiency" means the total flux (in lumens) exiting the translucent surface of a lighted sign cavity divided by the total flux emitted by the light source(s) within the lighted sign cavity.

One aspect of the invention is a low-loss, partially diffuse-reflective and partially diffuse-transmissive diffuser film, optionally laminated to a clear, non-diffusing substrate if necessary to provide structural integrity, for use in association with at least a portion of a translucent surface of a lighted sign cavity having interior surfaces at least as reflective as painted walls, wherein the diffuser film provides an increase in luminance efficiency of the lighted sign over a lighted sign that does not have such film applied therein.

Preferably when co-laminates are present for structural integrity, the low loss diffuser film occurs as the layer closest to the interior of the sign cabinet.

Light incident upon the diffuser film of the present invention from the interior of the lighted sign cavity is partially reflected and partially transmitted by the diffuser film. The reflected light is returned to the cavity of the lighted sign. The transmitted light passes through diffuser film and, optionally, the co-laminates of the diffuser film if present, and exits the lighted sign to the viewer without further reflection.

Luminance efficiency is provided by the diffuser film of the present invention because there is no significant absorption of light as such light reaches the low-loss, diffuser film of the present invention.

Therefore, "low-loss" means the absence of absorption of light in the diffuser film of the present invention when such light reaches such film from inside a lighted sign. A diffuser film of the present invention is low-loss even though it may be partially transmissive and partially reflective. For every 100 lumens reaching the diffuser film, 58 lumens might be reflected and returned to the lighted sign cavity and 41 lumens might be transmitted through the translucent surface. But only 1 lumen could be considered as absorbed by the diffuser film and lost to luminance efficiency. That means luminance efficiency using diffuser films of the present invention results in 99 luminance efficiency. With this unexpected luminance efficiency, the entire engineering science of lighted signs can be rewritten to take such superior luminance efficiency into consideration for energy consumption, lighting effect, or both.

Any significant absorption in the translucent surface of a lighted sign might occur within any co-laminates with the film to the translucent surface, namely, optional adhesive and substrate layers that could be needed to adhere and support, respectively, the diffuser film of the present invention to the translucent surface of a lighted sign.

Moreover, any significant absorption affects only the light transmitted by the diffuser film. Reflection of light from the interior side of the film back into the lighted sign cavity occurs without significant absorption.

When the reflectivity, R, of the diffusing film is greater than about 50 percent, light emitted by the source within the lighted sign cavity is, on average, reflected by the face and the walls several times before exiting the translucent surface of the lighted sign. This recycling of light within the lighted sign cavity is critical when uniform illumination of the transmitted light over the surface of the translucent face is required. The diffuser films of the present invention minimize loss of luminance efficiency and substantially and unexpectedly increase the efficiency of the recycling process of light reflected within the lighted sign cavity.

Optionally, but preferably, the low-loss diffuser film of the present invention is used in conjunction with diffuse reflective films that line the walls of the lighted sign cavity, as disclosed in copending, coassigned, U.S. patent application. Ser. No. 09/070,380, now abandoned, coassigned, U.S. Pat. No. 6,080,467, diffusely reflecting multilayer polarizers and mirrors (such as those disclosed in coassigned, U.S. Pat. No. 5,825,542, microporous membranes (such as thermally induced phase separated films as disclosed in coassigned, U.S. Pat. No. 5,976,686, the disclosures of which are incorporated by reference herein.

Briefly, such a film is applied to at least a portion of an interior surface of a lighted sign housing. It captures the lumens of light from the light source or those lumens of light reflecting back from a diffusing panel or sides and backs of the light cabinet or those lumens reflected by the translucent surface and re-emits such light with little loss until such light eventually exits the translucent surface of the sign housing.

Preferably, the diffuser film of the present invention is selected from the group consisting of films that are both partially transmissive and partially reflective. Nonlimiting examples of such films include Scotchcal™ 3635-30 and 70 Diffuser Films and Scotchcal™ 3630-20 Diffuser Film.

"Film" means a thin, flexible sheet in existence prior to contact with a lighted sign cavity or its translucent surface thereof.

"Diffuse reflective film" means a film that is reflective without being a mirrored surface. "Reflective" is an adjective of the noun "Reflectivity" which is expressed in an industrial standard established by the American Society for the Testing of Materials (ASTM) in Standard ASTM E1164-94, the publication of which is incorporated herein by reference.

"Luminance uniformity" means the lumens of light emanating from a translucent surface are substantially uniform in a large number of locations on the surface, yielding a sign that does not significantly identify the location(s) of light source(s) within the sign housing. Uniformity is optimally 1.0, a function of the ratio between extremes of luminance at two different points on the translucent surface of the lighted sign cavity.

Optionally but more preferably, the film lining interior surfaces of the lighted sign cavity comprises a diffuse reflective film having a reflectivity of at least 80% as measured using ASTM E1164-94 and selected from the group consisting of polyolefin films filled with white particles, blends of incompatible polymers, polyolefin multilayer films; microvoided polyolefin and polyester films; fluorinated polyolefin films; vinyl chloride polymeric films filled with white particles; acrylic films filled with white particles; polyolefin films co-extruded with ethylene-vinyl acetate films; and combinations thereof.

Another aspect of the present invention is a lighted sign having a translucent surface and an interior surface, comprising (a) a diffuser film as described above applied to the translucent surface, and (b) a film applied to at least a portion of the interior surface, wherein the film has a reflectivity of at least 80% as measured using ASTM E1164-94.

Another aspect of the present invention is a method of predicting luminance efficiency of a lighted sign cavity for selection of the optimal film(s) to line the lighted sign cavity and to serve as a diffuser film on the translucent surface of the lighted sign cavity, comprising the steps of:

(a) gathering data to solve equation (1):

$$\varepsilon = (1-\alpha)(1-R-A)\frac{1-(1-f)(1-\mathbf{R}^N)}{1-R+R(1-\mathbf{R}^N)} \quad (1)$$

where $\varepsilon$ = luminance efficiency of the lighted sign $\mathbf{R}$ = the total reflectivity of the interior walls of the cavity $R$ = the total reflectivity of the diffuser film $A$ = the total absorptivity of the diffuser film $\alpha$ = the total absorptivity of the adhesive and substrate layers (if present)

$f$ = the fraction of light emitted by the source that strikes the face without first reflecting off the walls $N$ = the average number of reflections off the walls between successive encounters with the face and (b) constructing a lighted sign cavity using film(s) that maximize the luminance efficiency for a given geometry of the lighted sign cavity.

The use of equation (1) solves a major problem of the lighted sign industry. Uniformity of translucent face illumination is a must in the lighted sign industry. The design of back-lit signs has traditionally focussed upon the optical characteristics that affect uniformity. Several standards have emerged to ensure adequate uniformity:

1. The angular distributions of reflectivity (face and walls) and transmission (face only) should be diffuse, as opposed to specular.

2. The reflectivity of the face (R) should be at least 60 percent. Reflectivities substantially greater than 60 percent further enhance uniformity, but at the expense of low efficiency. R=0.60 is usually adopted as a design target. For face materials which achieve R=0.60 by loading with scattering particles (such as $TiO_2$) R=0.60 usually ensures a diffuse angular distribution of reflectivity and transmission.

3. The fraction of light striking the face via direct paths (f) should be as small as possible. The minimum value attainable is usually dictated by the aspect ratio of the cabinet in cross section. Values as small as 0.25 are typically realized in deep cabinets, epitomized by self-contained channel letters. Shallow cabinets, epitomized by traditional sign cabinets, typically possess values closer to 0.50.

The value of N is also determined in large part by the aspect ratio of the cabinet in cross section. N=2.5 is thought to be representative of deep cabinets. Values as small as 1.0 are possible in extreme shallow cabinets.

The remaining optical characteristics (not constrained by the requirement for uniformity) are the reflectivity of the walls (R) and the absorptivities of the diffusing layer (A) and any optionally adhesive and substrate ($\alpha$). Efficiency increases with increasing R and decreasing A and $\alpha$.

The impact upon efficiency of increasing (R) is disclosed in coassigned, U.S. patent application Ser. No. 09/070,380, now abandoned, the disclosure of which is incorporated by reference herein.

Use of equation (1) in the present invention is directed toward substantially reducing A while retaining $\alpha$=0.

A feature of the present invention is that diffuser films of the present invention are low-loss and can be combined with diffuse reflective films on interior surfaces of a lighted sign cavity in a manner that unexpectedly increases luminance efficiency.

An advantage of the present invention is the use of diffuser films that increase luminance efficiency in translucent surfaces of a lighted sign cavity.

Another advantage of the present invention is the ability to use equation (1) to select films for and to construct a lighted sign that reduces A while retaining $\alpha \equiv 0$ to increase luminance efficiency.

Further features and advantages of the invention will be found in the description of embodiments of the invention in conjunction with the following drawings.

EMBODIMENTS OF INVENTION

Figure 1:
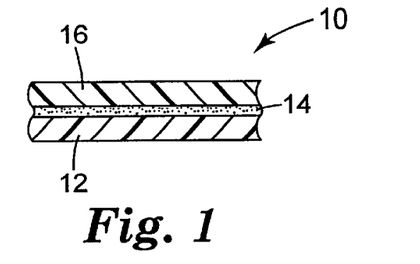
FIG. 1 is a cross-sectional view of one embodiment of a diffuser film laminate on the translucent surface of a lighted sign cavity.

FIG. 1 shows an optional construction of a diffuser film laminate serving as the translucent surface of a lighted sign cavity. Laminate 10 comprises a diffuser film 12, an adhesive 14, and a substrate 16. Substrate 16 and adhesive 14 are only required if film 12 lacks sufficient structural integrity or is insufficiently durable to withstand environmental conditions encountered by lighted signs: wind, sun, rain, heat, cold, and the like.

Nonlimiting examples of diffuser films 12 include Scotchcal™ 3635-30, 3635-70, 3630-20, Panaflex™ 930, 945, 600, 635, 645 and diffuse rigid plastic acrylic, polycarbonate and PETG substrates. Further and more preferably, microporous membranes disclosed in U.S. Pat. No. 4,539,256 (Shipman et al.), U.S. Pat. No. 4,726,989 (Mrozinski), and U.S. Pat. No. 5,120,594 (Mrozinski); ; the disclosures of which are incorporated by reference herein, can be used.

Films 12 can have a thickness ranging from about 0.01 mm to about 6.35 mm and preferably from about 0.02 mm to about 0.7 mm. Most preferably, such films can have a thickness ranging from about 0.05 mm to about 0.08 mm.

Films 12 can have a reflectivity ranging from about 0.50 to about 0.70 and preferably from about 0.55 to about 0.65.

Films 12 can have a transmissivity ranging from about 0.30 to about 0.50 and preferably from about 0.35 to about 0.45.

Films 12 can have an absorptivity ranging from about 0.00 to about 0.15 and preferably from about 0.00 to about 0.03.

Nonlimiting examples of adhesives 14 include acrylate adhesives and other pressure sensitive adhesives disclosed in Satas, Ed., *Handbook of Pressure Sensitive Adhesives, Second Edition,* (Van Nostrand, New York, 1989), the disclosure of which is incorporated by reference herein. Adhesive layer 14 can have a thickness ranging from about 0.002 mn to about 0.10 mm and preferably from about 0.1 mm to about 0.10 mm.

Further choices for adhesive layer 14 include those selected according to the signage involved, the nature of the substrate, and other factors known to those of skill in the art. For example, a pressure sensitive adhesive may be desired for some applications, and in addition to the pressure sensitive properties the ability to slide or reposition the article before the adhesive sets or cures may also be advantageous. Commercially superior pressure sensitive adhesives for sign graphics are available on image graphic webs marketed under the Scotchcal™ and Scotchcal™ Plus brands from 3M of St. Paul, Minn., USA. Pressure sensitive adhesives having this utility are disclosed in a variety of patents. Among these adhesives are those disclosed in U.S. Pat. No. 5,141,790 (Calhoun et al.); U.S. Pat. No. 5,229,207 (Paquette et al.); U.S. Pat. No. 5,296,277 (Wilson et al.); U.S. Pat. No 5,362,516 (Wilson et al.); PCT Patent Publication WO 97/18246; and copending, coassigned U.S. patent application Ser. Nos. 08/775,844, 08/613,753, now abandoned; and Ser. No. 08/606,988, now abandoned, the disclosures of all of which are incorporated by reference herein. A release liner may also be applied to protect the adhesive layer until needed.

Nonlimiting examples of optional substrates 16 include polycarbonate (such as Lexan™ branded polycarbonate from General Electric Co. of Pittsfield, Mass., USA, Implex® Plus impact acrylic sheet from Atohaas Americas Inc., and Spectar™ copolymer from Eastman Chemical of Johnston City, Tenn.). Substrate 16 can have a thickness ranging from about 0.02 mm to about 6.3 mm and preferably from about 2.54 mm to about 5.1 mm.

Figure 2:
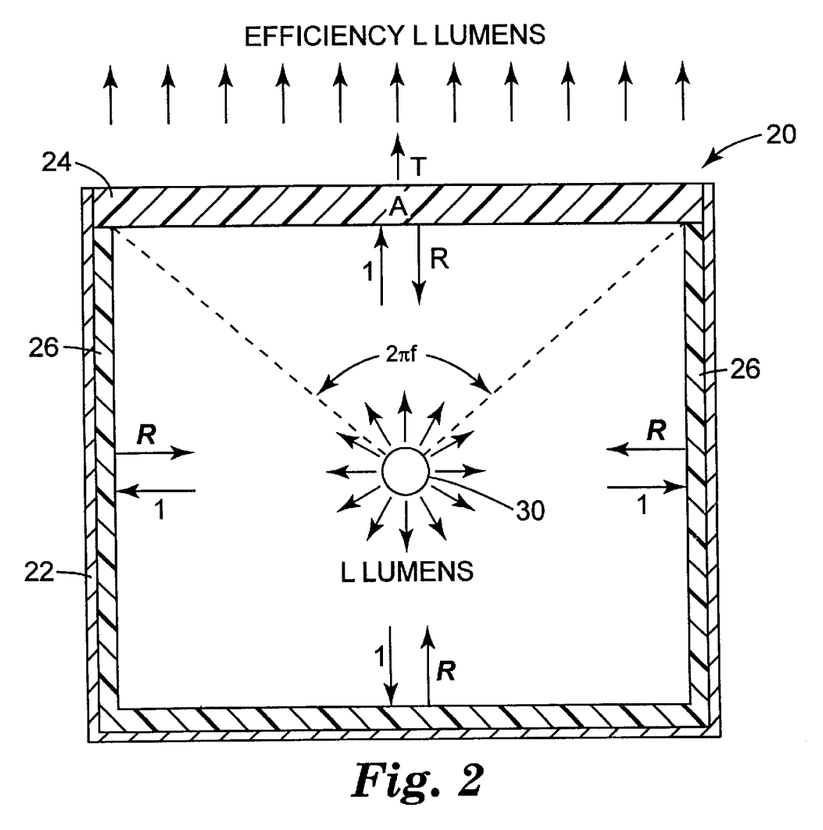
FIG. 2 is a cross-sectional view of a lighted sign cavity interpreting equation (1) of the present invention.

FIG. 2 discloses a cross-sectional view of a lighted sign 20 that illustrates the use of a diffuser film laminate in the construction of a lighted sign. FIG. 2 also demonstrates how equation (1) can be employed to determine the selection of films to construct a lighted sign cavity that maximizes luminance efficiency.

A sign 20 comprising a housing, generally 22, having a translucent facing side 24, two sidewall interior surfaces 26, one backwall interior surface 28, and a light source 30.

The low-loss diffuser film 12, can become at least a portion of the translucent surface 24, in any amount of surface area but preferably over the entire surface area of surface 24. The remaining area, if any, of surface 24 can be made of the substrate 16.

Optionally but preferably, interior surfaces 26 and 28 can be constructed of any material that improves reflectivity R, to be at least about 0.60. Preferably, the reflectivity should be at least about 0.80 which is provided by painted surfaces using a $TiO_2$ containing paint. More preferably, the reflectivity should be at least about 0.90, which can be provided by the use of diffuse reflective films disclosed in coassigned, U.S. patent application Ser. No. 09/070,380, now abandoned and U.S. Pat. No. 4,539,256 (Shipman et al.), U.S. Pat. No. 4,726,989 (Mrozinski), and U.S. Pat. No. 5,120,594 (Mrozinski). The disclosure of all of these co-assigned applications and patents are incorporated by reference herein.

Further choices for films for surfaces 26 and 28 are disclosed in coassigned, U.S. Pat. No. 6,080,467, diffusely reflecting multilayer polarizers and mirrors (such as those disclosed in coassigned, U.S. Pat. No. 5,825,542, microporous membranes (such as thermally induced phase separated films as disclosed in coassigned, U.S. Pat. No. 5,976,686; polyolefin films filled with white particles (such as Teslin™ brand film sold by PPG of Pittsburgh, Pa., USA); blends of incompatible polymers (such as Melinex™ branded polyester/polypropylene films from DuPont of Wilmington, Del., USA); microvoided polyester films; polyolefin multilayer films (such as Tyvek™ branded polyolefin films commercially available from DuPont of Wilmington, Del., USA); fluorinated polyolefin films (such as polytetrafluoroethylene); vinyl chloride polymeric films filled with white particles; acrylic films filled with white particles; and polyolefin films co-extruded with ethylene-vinyl acetate films (such as disclosed in copending, coassigned, U.S. patent application Ser. No. 08/867,891 (Emslander et al.) incorporated by reference herein); and films having a first birefringent phase and a second phase of differing index of refraction as described in U.S. Pat. No. 5,825,543 U.S. patent application Ser. No. 08/807,268, now abandoned, and Ser. No. 08/807,270 and combinations thereof. All applications and patents are incorporated herein as if fully rewritten.

Preferably, such films are the thermally induced phase separated films identified in the coassigned patent application above and generally disclosed in U.S. Pat. No. 4,539,256 (Shipman et al.), U.S. Pat. No. 4,726,989 (Mrozinski), and U.S. Pat. No. 5,120,594 (Mrozinski), the disclosure of which is incorporated by reference herein.

Films for surfaces 26 and 28 typically have a major surface covered with adhesive. Such adhesive will generally be found on the bottom of the film (continuous or portions depending on the embodiment involved) and allows the film to be securely attached to a sign cabinet wall, panel, table, floor, ballast, transformer, or other substrate. The type of adhesive is selected according to the signage involved, the nature of the substrate, and other factors known to those of skill in the art. For example, a pressure sensitive adhesive may be desired for some applications, and in addition to the pressure sensitive properties the ability to slide or reposition the article before the adhesive sets or cures may also be advantageous. Commercially superior pressure sensitive adhesives for sign graphics are available on image graphic webs marketed under the Scotchcal™ and Scotchcal™ Plus brands from 3M of St. Paul, Minn., USA (3M). Pressure sensitive adhesives having this utility are disclosed in a variety of patents. Among these adhesives are those disclosed in U.S. Pat. No. 5,141,790 (Calhoun et al.); U.S. Pat. No. 5,229,207 (Paquette et al.); U.S. Pat. No. 5,296,277 (Wilson et al.); U.S. Pat. No. 5,362,516 (Wilson et al.); PCT Patent Publication WO 97/18246; and copending, coassigned U.S. patent application Ser. Nos. 08/775,844; 08/613,753, now abandoned; and Ser. No. 08/606,988, now abandoned, the disclosures of all of which are incorporated by reference herein. A release liner may also be applied to protect the adhesive layer until needed.

Alternatively to adhesives, mechanical fasteners can be used if laminated in some known manner to that opposing major surface of the diffuser film. Nonlimiting examples of mechanical fasteners include Scotchmate™ and Dual Lock™ fastening systems, as disclosed in PCT Patent Application Serial No. 08/930957 (Loncar), the disclosure of which are incorporated by reference herein.

With adhesive, such films have a thickness ranging from about 50 $\mu$m to about 500 $\mu$m and preferably from about 75 $\mu$m to about 375 $\mu$m. This thickness permits the adhesive-backed film to be applied to any of the interior surfaces 26 and 28 of housing 22 as seen in FIG. 2 without substantially altering the dimension inside the housing for the sign 20 to remain in compliance with electrical codes and other regulations.

Light source 30 can be singular or multiple and can be of any type described above. For every lumen (L) of light emanating from light source 30, it is a goal for lighting engineering to maximize the number of lumens (L) exiting sign 20 through translucent surface 24. As seen in FIG. 2, expressed in the form of 1 lumen, the reflectivity R from interior surfaces 26 and 28 and the reflectivity R from translucent surface 24 reflect within sign 20. The absorptivity A of the diffusing film 12 (and any absorptivity $\alpha$ of optional adhesive 14 and substrate 16, not shown in FIG. 2) should be minimized for transmission T of lumens of light through surface 24 to the viewer.

FIG. 2 is a simple depiction of an orthogonally shaped lighted sign 20. Because of marketing requirements, many different shapes and depths of lighted sign cavities can benefit from the films and prediction equations of the present invention. For example, the efficiency of a 17.145 cm (6¾ inch) diameter, 12.065 cm (4¾ inch) deep circular-cylindrical cabinet with a 17.145 cm (6¾ inch) diameter face was measured for each combination of 4 known values of R, 3 known combinations of R, A, and $\alpha$, and a single known value of f. These values agreed with the prediction of equation (1) within experimental error ($\Delta\epsilon$~+/−0.05) when N was chosen to yield the best possible fit with all 12 measured efficiencies. The estimate of N so obtained (N=2.5) was consistent with expectations based upon the geometry of the cabinet and the diffuse-reflective character of the walls 26 and 28 and face 24. Thus, equation (1) provides an excellent prediction model by which the impact of the present invention, or any other signing engineering, can be assessed.

The following examples further characterize embodiments of the present invention.

EXAMPLES AND USEFULNESS OF THE INVENTION

The following examples demonstrate the unexpected benefits of the present invention using diffuser films that exhibit low-loss, especially in combination with films disclosed in co-pending applications identified above. More particularly, diffuser films in combination with diffuse reflective films disclosed in coassigned, U.S. patent application Ser. No. 09/070,380, now abandoned, unexpectedly increase luminance efficiency. Most particularly, as reflectivity R increases past 0.9 and approaches 0.98, luminance efficiency $\epsilon$ increases geometrically according to, and in a manner predicted by, equation (1) above. In other words, the preferred combination of the diffuser films 12 with diffuse reflective films lining interior surfaces 26 and 28 approach 100% luminance efficiency for both shallow and deep cabinets.

Figure 3:
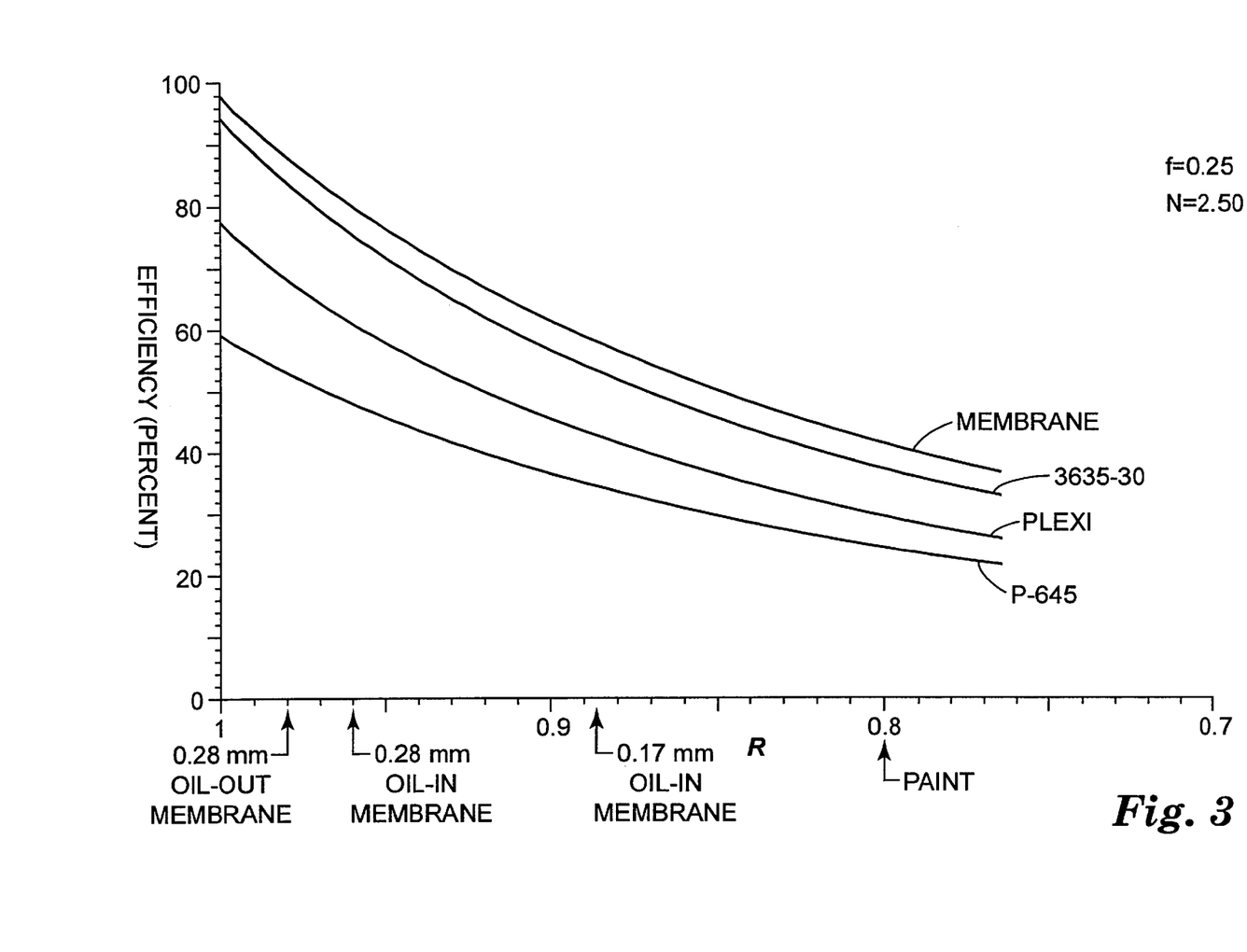
FIG. 3 is graph predicting luminance efficiency of "deep" lighted sign cavities using a variety of diffuser films, using equation (1).
Figure 4:
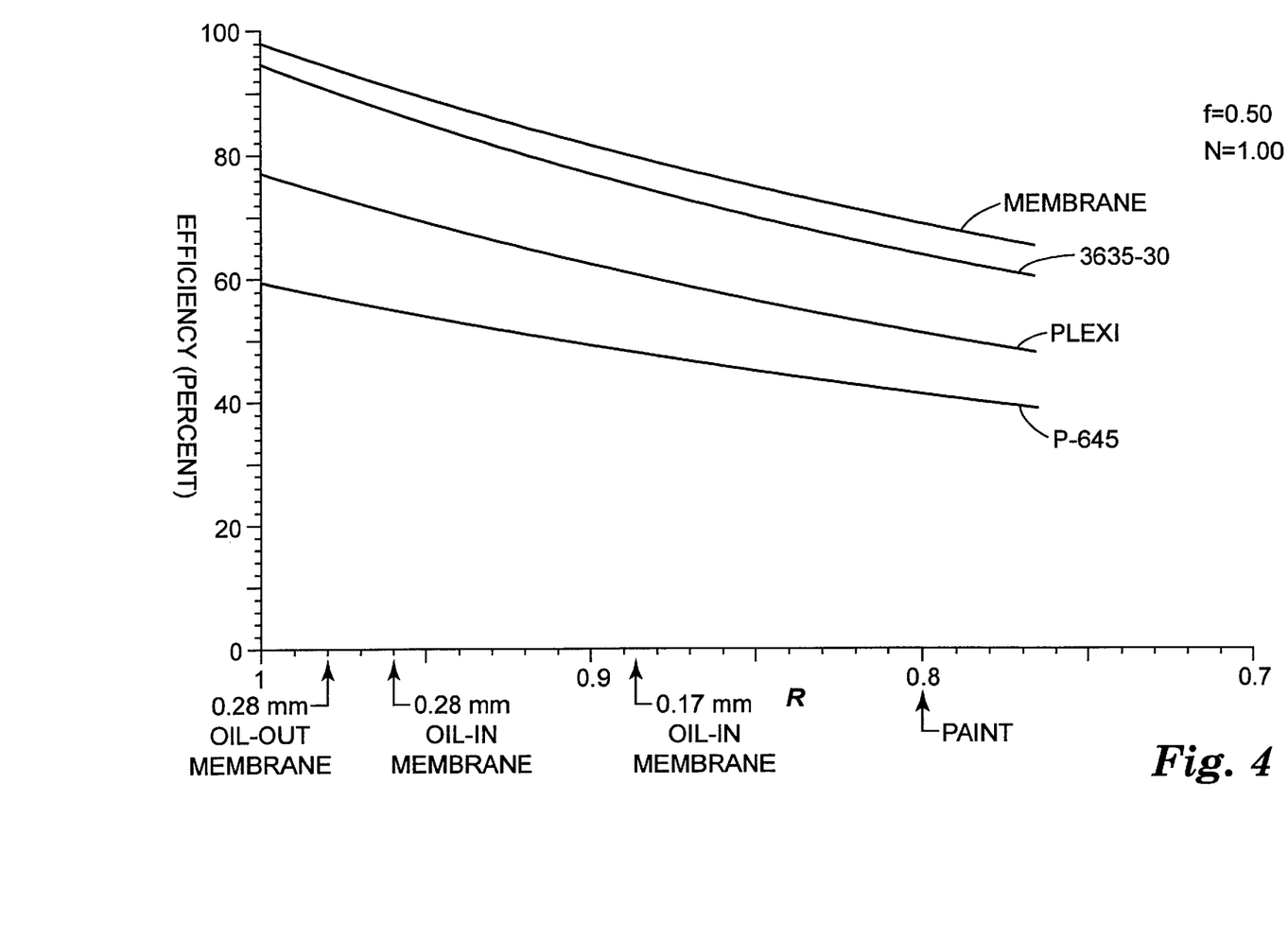
FIG. 4 is graph predicting luminance efficiency of "shallow" lighted sign cavities using a variety of diffuser films, using equation (1).

FIGS. 3 and 4 illustrate the predicted impact of the selection of diffuser film material on the efficiency of generic deep (f=0.25, N=2.5) and shallow (f=0.50, N=1.0), respectively, single face sign cabinets. Most cabinets are expected to fall at or between these two extremes.

In each FIG., the luminance efficiency $\epsilon$ is plotted as a function of R for four different diffuser films. These are Panaflex 645 flexible sign substrate from 3M; 0.47 cm (3/16 inch) diffusing Plexiglass(acrylic) obtained from Young Electric Sign Co. in Salt Lake City, Utah; 3635-30 translucent Scotchcal film from 3M laminated to a 0.31 cm (⅛ inch) thick clear Plexiglass sheet; and 0.07 mm (3-mil) oil-in microporous membrane prepared according to the Shipman and Mrozinski, patents identified above, also laminated to 0.31 cm clear Plexiglass.

Panaflex and Plexiglass materials are common face materials used in the lighted sign industry today. Scotchcal 3635-30 film is an existing 3M product which is not commonly used as a face material. The reflectivity R and transmissivity T=(1−R−A) of the diffusing component of each laminate were measured on a Lambda-19 spectrophotometer, and the absorptivity (A) calculated by subtraction from one. The results are summarized in Table 1.

TABLE 1

Measured Face Reflectivities and Transmissivities

| Diffuser Film | R | T | A | α |
|---|---|---|---|---|
| Panaflex-645 Film | 0.600 | 0.240 | 0.160 | 0 |
| Plexiglass | 0.640 | (0.280) | (0.120) | 0 |
| 3635-30 Film + Plexiglass | 0.620 | 0.360 | 0.020 | 0 |
| Oil-in membrane + Plexiglass | 0.578 | 0.414 | 0.008 | 0 |

Neither the Panaflex nor Plexiglass require lamination to a structural substrate, so that α=0 for these materials. The absorptivity of the Plexiglass is immeasurably small, so that α≈0 may be assumed for the Scotchcal film and the oil-in membrane as well.

As seen in FIG. 3, the reflectivity R of well-painted interior walls, as well as the reflectivities of several films, are indicated along the abscissa of each plot. Paint is the most common interior wall treatment used in the industry today. 0.28 mm (11-mil) oil-in microporous membrane, or an alternate material possessing a similar reflectivity exceeding 0.9, is representative of the most preferable interior surface treatments.

According to FIG. 3, many present-day channel letters are approximately 30-percent luminance efficient. Lining the interior walls of such a letter with 0.28 mm oil-in microporous membrane increases the efficiency to 62 percent. Replacing the Plexiglass face with 3635-30 film increases the efficiency to 38 percent.

In combination, 0.28 mm oil-in membrane and 3635-30 film increase the luminance efficiency to 76 percent. These benchmark results are summarized in Table 2. An eye of a viewer is primarily sensitive to relative increases in brightness. A 50-percent increase is at the threshold of noticeability. A 100 percent increase is quite noticeable. Similarly, the maintenance of brightness with the elimination of a row of illumination requires a 50 (3-row baseline) to 100 (2-row baseline) percent increase in efficiency. The relative increases afforded by oil-in microporous membrane alone, a low-loss diffuser film alone, and the two in combination are included in Table 2. By the above-stated criterion, the benefits of oil-in microporous membrane alone are significant. The benefits of microporous membrane in combination with a low-loss diffuser film of the present invention are unexpectedly significant and substantially greater. Those of low-loss diffuser films alone are not as significant.

The present-day baseline for traditional (shallow) sign cabinets is not as well defined as for channel (deep) letters. Both painted (R≈0.80) and unpainted (0.60<R<0.80) cabinets are common, as are both Plexiglass and Panaflex faces. Assuming a high-efficiency baseline (painted cabinet, Plexiglass face), lining the interior walls with 0.28 mm oil-in membrane increases the efficiency from 52 to 71 percent. Replacing the Plexiglass face with 3635-30 film increases the efficiency to 64 percent. In combination, 0.28 mm oil-in membrane and 3635-30 film increase the efficiency to 87 percent. These benchmarks, along with the corresponding relative increases, are summarized in Table 2.

By the above stated criterion neither the benefits of oil-in membrane linings alone nor those of low-loss diffuser films alone are significant in shallow cabinets. But in combination, their benefits are unexpectedly significant. The details of these results depends upon the selection of a baseline. The benefits of oil-in membrane are greater when R of the baseline is less; those of low-loss diffuser films are greater when A of the baseline is larger. Specific alternative scenarios can be assessed directly from FIG. 4.

TABLE 2

Benchmark Efficiencies of Deep and Shallow Cabinets

| | Deep Cabinets | | Shallow Cabinets | |
|---|---|---|---|---|
| | Efficiency | Rel. Increase | Efficiency | Rel. Increase |
| Baseline | 30 | — | 52 | — |
| Membrane | 62 | 107% | 71 | 37% |
| Diffuser | 38 | 27% | 64 | 23% |
| Both | 76 | 155% | 87 | 67% |

The following example considers the benefits of both high reflectivity interior surfaces and low loss face diffusers in shallow cabinets when R of the base line is small and A of the base line is high. In this situation the benefits of high reflectivity liners alone, those of low loss face diffusers alone, and those of the two in combination, are all significant.

Table 3 illustrates the impact of diffuser film upon the measured average brightness of the translucent surface of a typical shallow single-face sign cabinet. The subject cabinet is 1.23 m (4 feet) wide by 1.23 m high by 0.23 m (9 inches) deep. It is illuminated by four parallel and vertical 1.23 m (4 foot) fluorescent tubes. Measurements were made with bare aluminum interior back and sides, and with the interior back and sides lined with 0.30 mm (12-mil) oil-out membrane (R≈0.99). The brightness was measured at normal incidence at 5 evenly-spaced points across the top of the translucent surface, at 19 evenly-spaced points across the middle, and at 5 evenly-spaced points across the bottom. The finer spacing in the middle is to allow resolution of the bulbs. The average brightness in foot Lamberts (Candela/$m^2$ divided by 3.426) was calculated as the arithmetic mean of the 29 measurements. Measurements were made for each of seven diffuser film candidates. These are Panaflex-945, Panaflex-645, Panaflex-950 sign face substrates and Scotchcal 3630-20 film, Scotchcal 3635-30 film, Scotchcal 3635-70 film, and 0.07 mm (3-mil) microporous membrane. Each of the Scotchcal films and membranes were laminated to 3/16-inch clear Plexiglass having no absorptivity. The reflectivity and transmissivity of a small sample of each diffuse film candidate was measured on the Lambda-19 spectrophotometer.

The results are included in Table 3.

TABLE 3

Relative Measured Average Brightness and Predicted Efficiency

| Diffuser Film | R | T | A | Measured Brightness Al | Measured Brightness Membrane | Predicted Efficiency Al | Predicted Efficiency Membrane |
|---|---|---|---|---|---|---|---|
| Panaflex 945 | 0.642 | 0.225 | 0.133 | 0 | 1.00 | 1.89 | 1.00 | 2.10 |
| Panaflex 645 | 0.606 | 0.245 | 0.149 | 0 | 0.98 | 1.95 | 1.05 | 2.08 |
| Panaflex 950 | 0.624 | 0.259 | 0.117 | 0 | 1.11 | 2.03 | 1.13 | 2.30 |
| SC 3630-20 | 0.671 | 0.325 | 0.004 | 0 | 1.50 | 3.04 | 1.48 | 3.29 |
| SC 3635-30 | 0.630 | 0.362 | 0.008 | 0 | 1.65 | 3.25 | 1.59 | 3.27 |
| 0.07 mm membrane | 0.587 | 0.402 | 0.011 | 0 | 1.85 | 3.49 | 1.69 | 3.26 |
| SC 3635-70 | 0.415 | 0.578 | 0.007 | 0 | 2.24 | 3.98 | 2.10 | 3.33 |

Note: table has an extra column — the "A" values and trailing 0 appear to span; reading left-to-right: R, T, A, (blank 0), Measured Brightness Al, Measured Brightness Membrane, Predicted Efficiency Al, Predicted Efficiency Membrane.

The relative measured average brightness is reported in the 6$^{th}$ and 7$^{th}$ columns of Table 3. The baseline is bare aluminum interior back and sides with a Panaflex 945 translucent surface. All other measurements are compared with this baseline, making the percentage increase of improvement easy to discern. The measured average brightnesses both with and without the membrane liner fall into one of three groups.

(1) Panaflex-945, Panaflex-645, and Panaflex-950 films possess comparable high absorptivities and exhibit comparable low brightnesses relative to the other diffusers.

(2) Scotchcal 3630-20 film, Scotchcal 3635-30 film, and 0.07 mm thick oil-in-membrane possess comparable low absorptivities and exhibit comparable high brightnesses. They yield roughly a factor of ⅔ increase relative to the Panaflex 945 baseline.

(3) Scotchcal 3635-70 film possesses an absorptivity comparable to Scotchcal 3630-20 film, Scotchcal 3635-30 film, and 0.07 mm membrane, yet exhibits a significantly higher brightness. This is an artifact of its unusually-low reflectivity R, the lowest of all of the diffuser film candidates. Of all the materials tested, only Scotchcal 3635-70 film possess a reflectivity R substantially less than 0.60, and only Scotchcal 3635-70 film exhibits visually-detectable non-uniformity. Despite its high brightness, it is not a suitable face material because it does not yield adequate uniformity.

The correlation between low absorptivity and high brightness, for either low or high reflectivity interior back and sides, is clearly evident in the results of Table 3. And the significance, by the previously stated criterion, of the benefits of a highly reflective liner alone, a low loss face diffuser alone, and the two in combination, is also clearly evident.

The relative predicted efficiency for each of the seven face materials is shown in the final columns of Table 3. These are predicted from equation (1) above, assuming, f=0.50, N=1.0, and R=0.60 for bare aluminum or R=0.99 for the 0.30 mm oil-out membrane. The average brightness, as measured, is proportional to the efficiency. As long as the constant of proportionality is fixed, the relative brightness and the relative efficiency are equal. But the constant of proportionality unexpectedly increases as the angular distribution of light transmitted through the translucent surface becomes more peaked in the forward-scattering direction. And the angular distribution of transmission is expected to become more peaked as the reflectivity of the translucent surface decreases. This, perhaps, is responsible for the discrepancy between relative brightness and relative efficiency for Scotchcal 3635-70 film. The remaining discrepancies are within the expected uncertainties of the prediction equation (1) and the Lambda-19 measurements of R and A. These validate the use of equation 1 to predict the luminance efficiency of shallow cabinets. In combination with the previously referenced validation for a deep cabinet, they validate the use of equation 1 to predict the efficiency of cabinets of widely varying geometry.

Figure 5:
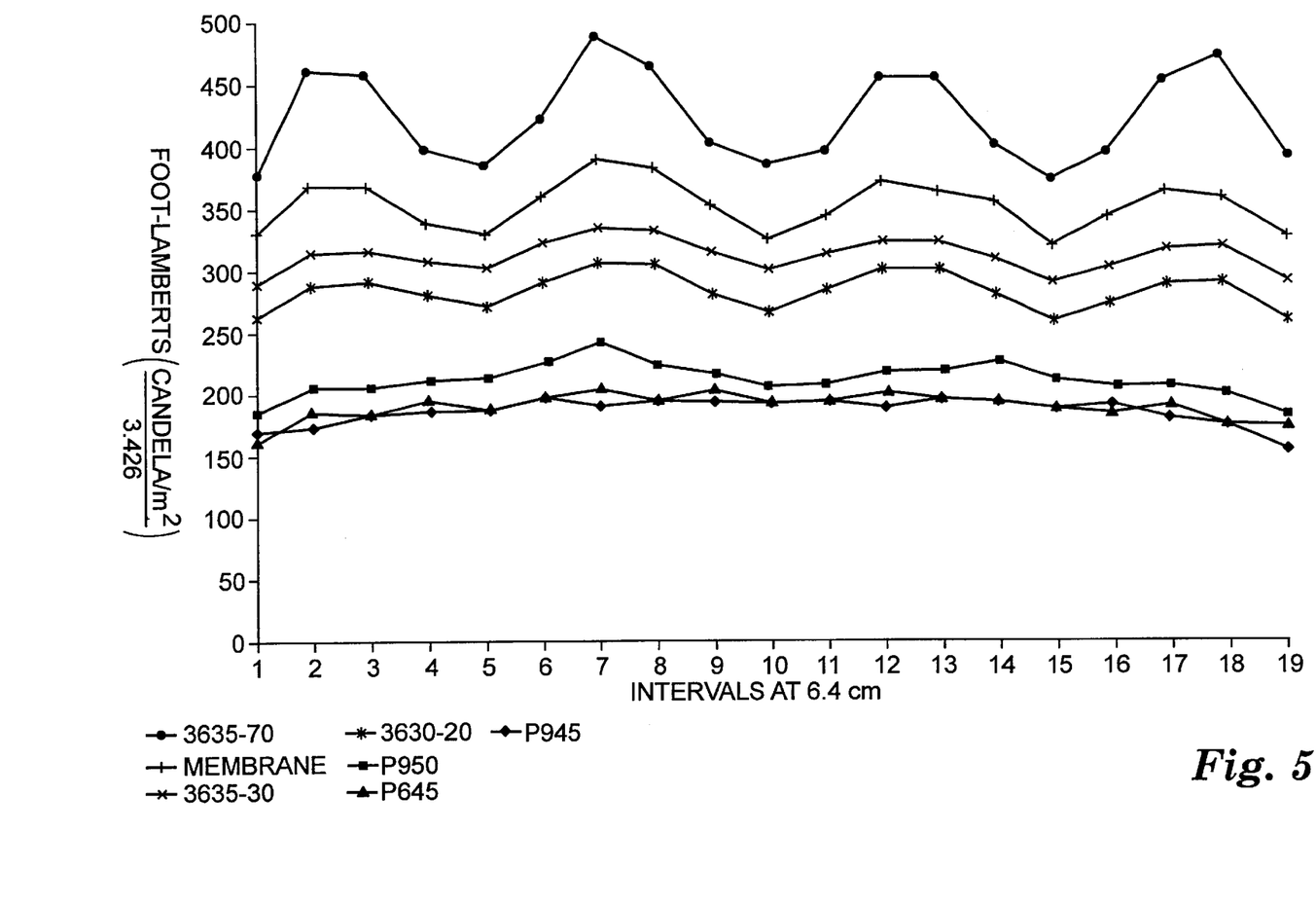
FIG. 5 is a graph of actual measurements of an aluminum lighted sign cavity using a variety of diffuser films.

FIG. 5 is a graph showing the results of actual measurements of luminance in foot-Lamberts (Candela/m$^2$/3.426) at 6.4 cm intervals across the same aluminum sign cavity (using a luminance meter Model LS 110 manufactured by Minolta resting directly on the translucent surface) as that reported in Table 3 for each of the diffuser films reported in Table 3. The distinction of the three categories enumerated above is plainly evident from the graph of FIG. 5. The 3635-70 film is unacceptable for a diffusion lighted sign because the points of light source are plainly evident through the translucent face of the lighted sign. The Panaflex 645, 945, and 950 films provide good diffusion but with less brightness than the more preferred Scotchcal films 3635-30 and 3630-20 and the 0.07 mm microporous membrane. As luminance increases, the appearance of light source location becomes more evident.

Figure 6:
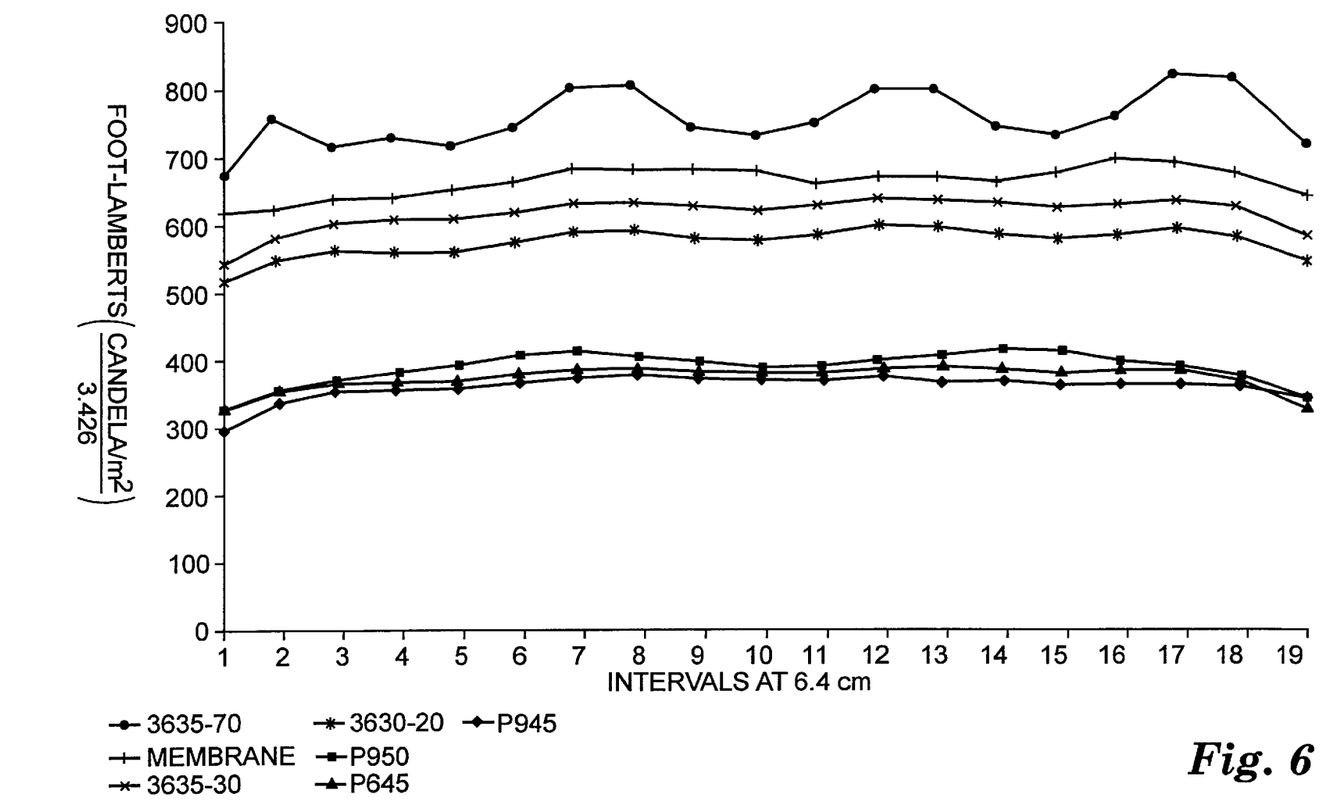
FIG. 6 is a graph of actual measurements of a lighted sign cavity having a diffuse reflective film on interior surfaces thereof using a variety of diffuser films.

FIG. 6 is a graph of the sign cavity lined with membrane according to the disclosure of coassigned, U.S. patent application Ser. No. 09/070,380, now abandoned, with the same diffuser films candidates as identified in Table 3. The same three groupings occur as in FIG. 5 and Table 3, but two key and unexpected effects become evident.

(1) The brightness of all of the diffuser candidates increases over their use in a bare aluminum sign cavity. This confirms the teaching of the Ser. No. 09/070,380 application.

(2) The identification of the light source has become far less noticeable, i.e., the lines of brightness measurements across the breadth of the translucent face of the lighted sign have flattened out. The benefits of this effect is more pronounced and advantageous for those preferred diffuser films discussed above. Only the 3635-70 film gives any indication as to light source.

The comparison of FIGS. 5 and 6 demonstrate many unexpected advantages of the present invention, ranging from increase in brightness for all diffuser films to a visible proof of the diffuser qualities of preferred films of the present invention without loss of brightness through absorptivity of such films, a proof of luminance efficiency using the present invention.

Combined with the use of equation (1), FIGS. 5 and 6 demonstrate that the engineering of lighted signs can take a direction not limited by type of light source, location of light source, or limitation of luminance efficiency. Prior limitations have been removed.

The invention is not limited to the above embodiments. The claims follow.

What is claimed is:

1. A lighted sign, comprising a translucent facing side, sidewall interior surfaces, a backwall interior surface, and a light source within the lighted sign, wherein said facing side comprises a low-loss, partially diffuse-reflective and partially diffuse-transmissive diffuser film having a reflectivity of from about 50% to about 70%, a transmisivity of from about 30% to about 50%, and an absorptivity from about 0% to about 15%, and said interior surfaces comprise an interior surface film and have a reflectivity of at least about 90% as determined by a ASTM E1164-94, wherein the diffuser film provides an increase in luminance efficiency of the lighted sign over a lighted sign that does not have such diffuser film applied therein.

2. The lighted sign of claim 1, wherein the interior surfaces comprise a film selected from the group consisting of paint that contains $TiO_2$, a diffuse reflective film, a semi-specular reflective film, and a specular reflective film having a diffuse reflective film laminated or coated thereto.

3. The lighted sign of claim 1, wherein the diffuser film comprises an oil-in microporous membrane.

4. The lighted sign of claim 3, wherein the membrane has a layer of pressure sensitive adhesive on one major surface and wherein the thickness of the membrane and adhesive ranges from about 0.012 mm to about 6.45 mm.

5. The lighted sign of claim 1, wherein the diffuser film is applied to substantially all area of the translucent surface of the lighted sign.

6. The lighted sign of claim 1, wherein the diffuser film has a thickness of from about 0.01 mm to about 6.35 mm.

7. The lighted sign of claim 1, wherein the diffuser film has a reflectivity of from about 55% to about 65%.

8. The lighted sign of claim 1, wherein the diffuser film has a transmissivity of from about 35% to about 45%.

9. The lighted sign of claim 1, wherein the diffuser film has an absorptivity of from about 0% to about 3%.

10. The lighted sign of claim 1, wherein the interior surface film has a reflectivity of at least 90% as measured using ASTM E1164-94 and is a diffuse reflective film selected from the group consisting of polyolefin films filled with white particles; blends of incompatible polymers; polyolefin multilayer films; microvoided polyolefin; microvoided polyester films; fluorinated polyolefin films; vinyl chloride polymeric films filled with white particles; acrylic films filled with white particles; polyolefin films co-extruded with ethylene-vinyl acetate films; and combinations thereof.

11. The lighted sign of claim 1, wherein the interior surface has a reflectivity of about 98% as measured using ASTM E1164-94.

* * * * *